Nov. 10, 1953     O. S. TIBBETTS     2,659,062
DETACHABLE COUPLING FOR ELECTRICAL CABLES
Filed May 3, 1950     2 Sheets-Sheet 2
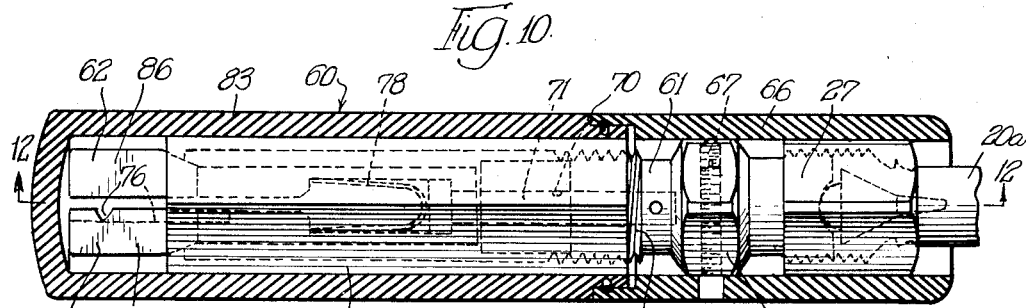
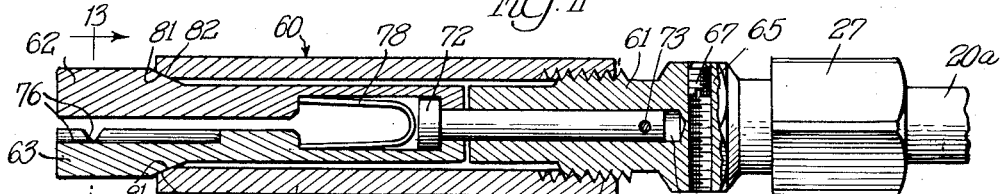
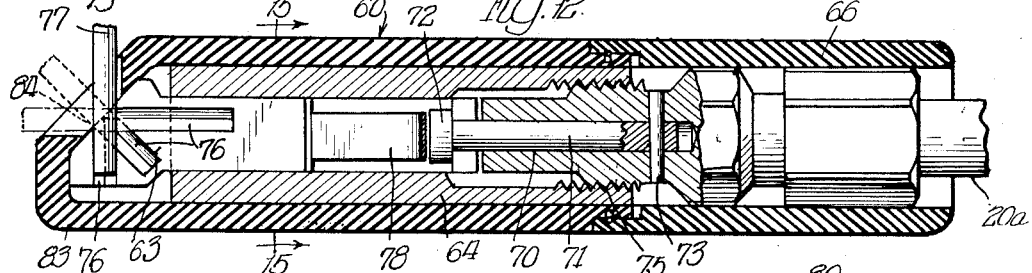
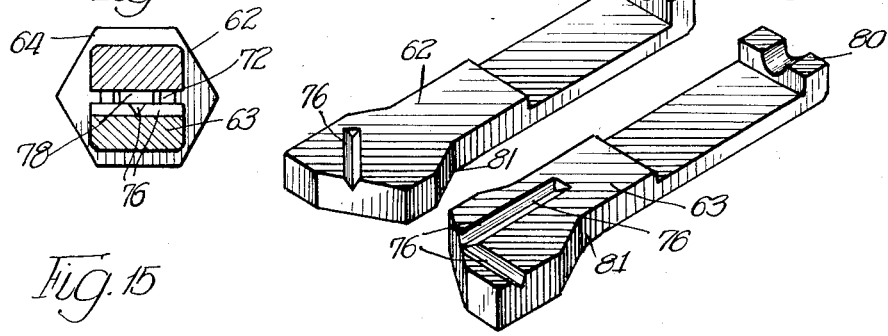
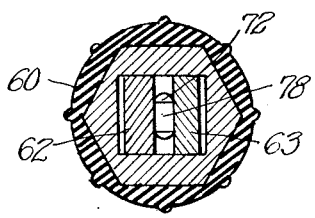
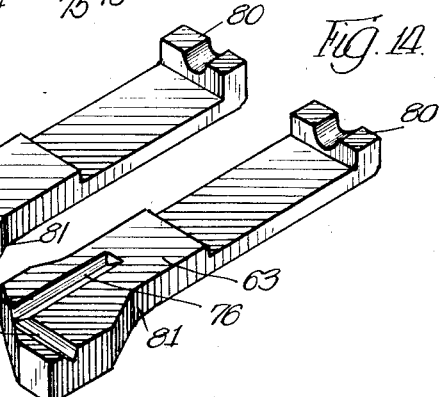
INVENTOR.
Otto S Tibbetts,
BY Patented Nov. 10, 1953

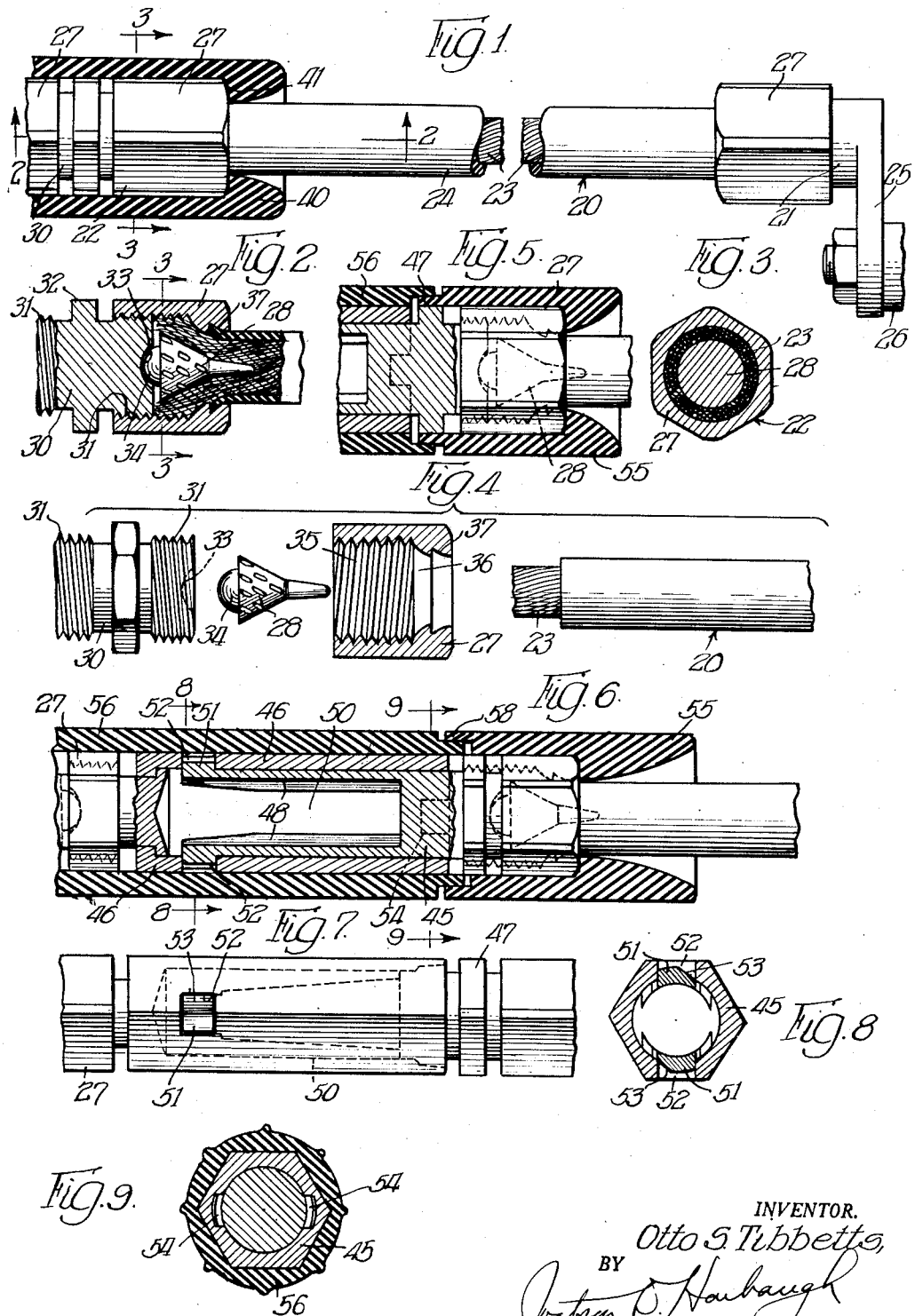

2,659,062

UNITED STATES PATENT OFFICE 2,659,062

DETACHABLE COUPLING FOR ELECTRICAL CABLES

Otto S. Tibbetts, Chicago, Ill.

Application May 3, 1950, Serial No. 159,764

4 Claims. (Cl. 339—211)

This invention relates generally to electric welding apparatus and more particularly to improved cable connectors and electrode holders whereby a fully insulated, low resistance electric circuit of completely interchangeable parts having high mechanical strength is achieved.

Electric or arc welding apparatus usually comprises a generator for producing a high current of several hundred amperes at a relatively low voltage, cable conductors for conveying the current to the work point, an electrode with which the arc is struck, and a holder for the electrode. Many types of connectors are in use to couple the holder to the cable conductor and to connect several conductors to each other and to the generator. For permanent connections, connector elements which merely effect a splice are usually employed, but where the connections must be broken periodically, various forms of quickly detachable connectors have been used which are not entirely satisfactory.

Since the currents involved are quite heavy and the voltages are low, particularly when the welding arc is struck, it is extremely important that all connections have little or no resistance so that full current power is available at the weld and no heating in the line will occur which detracts from the efficiency of the weld or causes fires.

It is also important that all connections in non-grounded conductors and electrode holders be fully insulated so that arcing can not occur except at the electrode and so that personnel cannot be injured by accidental grounding contact with bare conductors.

One object of this invention is to provide a welding apparatus in which all connections including those in the electrode holder have a relatively low resistance and are absolutely insulated to prevent inadvertent grounding with its accompanying fire and personnel hazards.

Another object is to provide an improved insulation sleeve arrangement for holders and couplings wherein the insulation material serves a dual function as a positive locking element preventing loosening of the electrical and mechanical connections between the conductors and the connector elements.

Another object is to provide an improved electrode holder which may be constructed of aluminum for lightness and which is completely insulated so that only the electrode is exposed, a portion of the insulation serving a dual function in that it insures that the electrical connections in the holder are maintained secure at all times in solid contact over substantial areas of mating surfaces.

Another object is to provide complete interchangeability between all connecting parts, each one with every one of the others employed in the line.

Another object is to provide a connector element arrangement wherein the insulation which covers the stranded cable is securely clamped in the connector so that it cannot pull loose to expose bare wire or conductors, but in which the primary clamping occurs on the cable strands for better electrical connection.

Another object is to provide a connector element which may be readily attached to the cable without the need for soldering or brazing, and which does not damage the cable strands or insulation covering them so that it may be removed and reinstalled without cutting off the end of the cable.

A further object is to provide a quickly releasable connector which has high mechanical strength when connected and effects good electrical contact, yet is very easy to connect and disconnect by a simple twisting motion of the two parts, being all that is required to lock or unlock the connection.

A further object is to provide an improved electrode holder which is particularly well suited for overhead or vertical welds because it is completely covered by insulation except for a small single opening through which the welding electrode extends and, furthermore, supports the electrode in any one of three different positions selected at will by the operator for optimum welding efficiency.

A further object is to provide an electrode holder which is completely enclosed in an insulating sleeve for longer life, the sleeves being replaceable from time to time as required.

Other objects and advantages of this invention will of course present themselves to those familiar with the art on reading the following specification:

In the drawings,

Fig. 1 is a view showing a length of cable provided with a terminal lug at one end and a splice coupling at the opposite end constructed according to this invention;

Fig. 2 is a section taken on line 2—2 of Fig. 1, the insulating sleeve being removed;

Fig. 3 is a section taken on line 3—3 of Fig. 2;

Fig. 4 is an exploded view showing the manner in which the elements of the coupling are assembled;

Fig. 5 is a section showing the first step in assembling the cable and the coupling;

Fig. 6 is a section showing a quickly detachable coupling constructed according to this invention;

Fig. 7 is a side view of the coupling of Fig. 6 shown with the insulating sleeves removed;

Fig. 8 is a section taken on line 8—8 of Fig. 6 with the insulation sleeve removed;

Fig. 9 is a section taken on line 9—9 of Fig. 6;

Fig. 10 is a plan view of an electrode holder constructed in accordance with this invention, the insulating sleeves being shown in section;

Fig. 11 is a horizontal section of the electrode holder with the sleeves removed;

Fig. 12 is a vertical section taken on line 12—12 of Fig. 10;

Fig. 13 is a section taken on line 13—13 of Fig. 11;

Fig. 14 is a perspective view showing the two jaw elements disassembled and lying side by side; and Fig. 15 is a section taken on line 15—15 of Fig. 12.

A complete welding cable assembly and electrode holder with full interchangeability to make various working combinations according to my invention is shown in the drawings. The welding generator or other source of current as well as the ground connection system has not been shown. It will be appreciated that a conventional current source can be employed and that the principles of this invention can be applied to the ground connection conductor and clip.

My invention is concerned primarily with providing a better mechanical and electrical connection arrangement in all portions of the welding circuit from the generator to the electrode. It is most easily understood by considering each of the elements in that circuit starting at the generator and proceeding to the electrode holder. In most cases the circuit comprises a plurality of cable lengths connected together and to the generator and electrode holder by suitable connection elements.

A section of multiple stranded insulated cable 20 provided with a connection lug 21 at one end and splice elements 22 at the other is shown in Figs. 1 to 4 of the drawings. In all of the figures of the drawings, like parts bear like numerals.

The cable 20 comprises an inner core of stranded conductors 23 covered with a tough, flexible synthetic or natural rubber insulation 24. It is preferred to use more flexible rubber covered cable in the last section of the line to which the electrode holder (Fig. 6) is connected because greater flexibility is desirable so that the holder may be more easily manipulated.

The lug assembly 21 comprises an L-shaped member 25, one end of which is flat and provided with a hole so that it may be secured to the terminal 26 on the generator, a threaded nut 27, and a conical element (not shown) which is identical with the element 28 in the connector splice 22.

The connector splice 22 in so far as it is attached to the cable 20 is identical with the lug 21, and the arrangement of the lug will be readily understood by reference to the splice 22. As shown in Figs. 2 and 4, the splice 22 comprises a connection element 30, a pair of nuts 27, and a pair of conical wedge members 28. The connection element 30 is generally cylindrical and has a thread 31 machined on each end. The middle portion 32 of the element 30 is hexagonal as are the outside surfaces of the nuts 27, the hexagons being the same size. This simplifies manufacture, for all the elements may be machined from hexagonal bar stock of one size for any given size of line of predetermined current carrying capacities. As a matter of fact, all of the hexagonal elements shown in the drawings are preferably made from the same size bar stock. Thus one size wrench is all that need be supplied with each particular line. The uniform hexagonal shape, however, serves an additional function in connection with the insulation as will be described later. Any other polygonal shape such as a square or an octagon could, of course, be used instead of a hexagon, but the latter is preferred because of its universal acceptance in bolt heads, etc.

Each end of the element 30 is machined to have a shallow spherical depression 33 therein which cooperates with one of the wedging members when the coupling splice is made up with the cable. The wedging members 28 are substantially conical at one end, the cone having an apex angle of about 30 degrees, and have a spherical projection 34 at the opposite end which is receivable in the spherical depressions 33, the spherical radius being the same in the depressions and the projections. This relationship is important for it permits relative pivotal shifting of the wedge member 28 without a loss of electrical conducting surface area.

The hexagonal nuts 27 are provided with an internal thread 35 and a stepped conical opening 36. The step or undercut 37 has a conical surface which diverges more rapidly than the passage 36 and provides a space for the end of the insulation 24 when the coupling is made up. The wall of the undercut serves to securely grip the insulation 24 so as to anchor it in place without splitting it lengthwise or cutting into it. This arrangement has been found to be decidedly superior to the conventional practice, for there is practically no danger of the insulation breaking or pulling away from the splice to expose bare cable. Furthermore, the undercut 37, by providing clearance for the insulation end, allows the conductor strands 23 to lie against the side wall of the conical passage 36 for better mechanical and electrical contact.

The splice is made up by first cutting the insulation 24 and wire strands 23, as shown in Fig. 4, so that the ends of the strands project from the insulation 24 a distance substantially equal to the diameter of the stranded conductor 23.

Next the end of the cable is inserted into the insulation shell 40 and thereafter into the nut 27 until the end of the insulation 24 rests against the end of the undercut 37, as shown in Fig. 2. Then holding the cable 20 and not the nut 27, the wedging member 28 is pressed into the end of the stranded conductor 23 to separate the individual strands thereof and partially lock the nut 27 to the cable 20. The nut 27 is then held against rotation and the end of the member 30 is threaded into the nut until tight, the hexagonal middle portion of the member 30 and the body of the nut 27 serving as wrenching surfaces.

The surface of the wedging member 28 is provided with a number of elongated, evenly distributed projections. These projections are disposed with their long dimension approximately at right angles to the lay of the cable strands 23 which come in contact with the surface of the member when the member 28 is inserted. These projections serve to hold the wedge member stationary with respect to the cable as the connector 30 is threaded into the nut. This prevents damage to the strands and improves the electrical connection, for the central strands of the cable are securely gripped to produce a superior electrical contact with the member 28. The outermost strands are forced outwardly and bear against the end portion of the internal thread and against the sides of the conical opening likewise effecting good electrical contact. The end of the insulation assumes the position shown in Fig. 2 lying in the undercut so as to be firmly held even if the insulation 24 is loose upon the cable strands 23, and yet the insulation does not hold the strands away from the conical surface to spoil the electrical contact. The spherical contact between the wedge member 28 and the element 30 allows the member 28 to move to a position where equal pressure is applied to the strands even if they are not evenly distributed about the wedge member 28. Furthermore, the use of spherical contacting surfaces materially reduces the friction between the element 30 and the member 28 as the coupling is made up.

The two elements 27 and 30 are tightened together until the hexagonal surfaces are aligned with each other so that the insulating sleeve 40 whose internal surface is hexagonal may be slipped over the nut 27 and element 30. Prior to slipping the sleeve 40 in place, however, the cable 20 leading away from the splice must be connected to the opposite side of the element 30 in the same manner as described above. The sleeve 40 may be held in place by an internal setscrew in a threaded transverse hole in the hexagonal portion of the member 30, if desired.

When both cables 20 have been connected and the hexagonal surfaces on the element 30 and the two nuts 27 have been aligned, the sleeve 40 is slipped over the splice to insulate it and to prevent any rotation of the nut 27 with respect to the element 30 which might result in a loosening of the splice. The sleeve 40 preferably has one end formed with a flange 41 as shown in Fig. 1 to serve as a location stop to determine its proper position. The other end is, of course, sufficiently large to pass over the nuts 27. Because of the flange 41 it is necessary to slip the cable 20 through the flanged end of the sleeve 40, as already mentioned, prior to making the splice, if the other end of that length of cable has already been attached to a connector.

In some cases it is preferred to use a simple hexagonal tube of insulation material having a uniform cross section throughout its length. As an insulation material I prefer to use laminated phenolic material, the layers of which may be wound on a mandrel and cured under heat and pressure to provide a tough, hard shell with high dielectric strength.

From the foregoing it will be appreciated that a very rugged coupling splice has been effected which permits the cable length to be dragged along by the insulation without the insulation tearing away. Furthermore, the splice has high mechanical strength and effects a good low resistance electrical connection between conductors. The splice is easy to effect, no special tools are required, and it may be disconnected and reassembled at any time simply by loosening a nut 27, forcing it backward to release the wedge member, pulling the member out, and drawing the nut off the wire end. Since neither the wire ends nor the insulation are cut or damaged when the coupling is made up, the cable need not be cut back prior to reattachment to the coupling.

A quickly detachable coupling is shown in Figs. 5 and 6 of the drawings. One or more of such couplings are generally provided in welding lines which must extend a substantial distance, for the total conductor length may be varied at will and the shorter individual cables are easier to store and handle.

The coupling comprises a double pronged element 45 and a receptacle element 46 which may be rapidly locked together in good electrical contact by inserting the pronged element 45 into the receptacle and giving it a half twist. To unlock the two the pronged element is given a second twist in the same direction and withdrawn.

Each of the elements 45 and 46 is provided with a connection arrangement similar to that of the splice 22. The pronged element 45 is provided with a hexagonal portion 47 for wrenching and locking by the insulating sleeves, and the body of the receptacle element 46 is hexagonal for the same purpose.

The two prongs 48 extend outwardly from the body of the element 45 and normally diverge slightly from the position shown in Fig. 6. The outer faces of these prongs 48 are machined to a cylindrical contour of the same diameter as the bore 50 of the receptacle element 46. The resilience of the prongs 48 causes them to bear outwardly against the sides of the receptacle when inserted therein to effect low resistance electrical contact. A lug 51 is provided on the end of each of the prongs 48 and engages in a rectangular opening 52 in the wall of the element 46 to lock the two together. To permit unlocking, the outer faces of the lugs 51 are machined to have inclined cam surfaces 53 (Fig. 8) thereon which cooperate with the side walls of the holes 52 to spring the prongs 48 inwardly and release the lugs from engagement in the openings when the pronged member is rotated in a clockwise direction as viewed in Fig. 8. To aid in this disengagement the edges of the openings 52 which cooperate with the inclined surfaces may also be beveled to provide a smoother cam action.

To facilitate insertion of the pronged element 45 into the receptacle element 46, a pair of diametrically spaced undercuts 54 are provided at the end of the bore 50. These undercut portions are preferably disposed at right angles to the diametrically spaced openings 52 for maximum ease in assembly of the coupling but may be in line or disposed at any other angle if desired. The depth of the undercuts 54 is such that the lugs 51 on the ends of the prongs 48 may be slipped therein without bending them inwardly, and this is the first step in assembling the coupling. The second step is to rotate the pronged element 45 with respect to the receptacle element 46. This causes the cam surfaces 53 to slide over the edges of the undercuts 54 and move the lugs inwardly. The two elements 45 and 46 are then moved toward one another and rotated until the lugs 51 engage the openings 52. The assembly of the coupling, although lengthy to describe, is actually a very simple procedure, for the operator's hands follow a very natural twisting and pushing movement to lock the two elements together and a similar twisting and pulling movement to separate the two, in both cases the twisting being in the same direction and preferably corresponding to the direction employed to thread a right-hand male thread into a female thread.

If desired, the edges of the undercuts 54 may be inclined to aid the cam action the same as the edges of the openings 52. Moreover, cam surfaces may be provided on both sides of the lugs 51 so that a twist in either direction will move the lugs 51 inwardly. The lugs, of course, may be squared off and the sides of the openings 52 and undercuts 54 inclined to provide for camming, but it has been found much easier from the machining standpoint to incline the lug surfaces and provide straight walled openings and undercuts.

The quick coupling elements as well as their associated cable attaching nuts 27 are insulated and locked by a pair of hexagonal sleeves 55 and 56 similar to the sleeves 40. The sleeves are illustrated in Figs. 5 and 6 but have been removed in Figs. 7 and 8. The sleeve 55 is similar to the sleeve 40 shown in Fig. 1 but is shorter so as to extend only to the edge of the hexagonal portion 47 of the element 45. The other sleeve 56 extend the full length of the element 46 and also encloses the nut 27. Thus each nut 27 is securely locked against rotation on its associated connector element, the inside contour of the sleeves being hexagonal so as to fit the outer surface of the connectors and nuts. At the juncture between the two sleeves, one is undercut and the other relieved so that a skirt portion 58 on the short sleeve 55 covers the end of the other sleeve 56 to form a dirt-tight seal. The two sleeves, however, are freely rotatable with respect to each other so that the coupling may be attached and detached simply by grasping the sleeves in the hands and twisting and pulling or pushing as the case may be. To aid in twisting the sleeves, the outer surfaces thereof are preferably provided with ribs as shown in Fig. 9, and arrows may be stamped thereon indicating the direction of rotation to lock and unlock the coupling.

Since very little force is required to draw the two elements apart once the coupling has been twisted to unlock the lugs 51, the sleeves 55 and 56 may be merely pressed on after the cables are attached and no additional means for holding them in position need be used.

From the foregoing it will be apparent that an improved, quickly detachable coupling unit has been provided which not only has all the advantages of the simple splice in so far as the cable attachment and nut locking arrangement is involved, but also which is a superior detachable coupling having high mechanical strength and low electrical resistance which cannot become uncoupled as a result of dragging the cable over the work, vibration, etc., positive twisting of the two elements being required before they can be separated.

The coupling is preferably connected in the circuit so that the receptacle element 46 is connected to the conductor leading from the current source and the pronged element 45 is connected to the cable extending to the electrode holder. Thus when the coupling is detached, the live element is the receptacle element 46 which is completely sheathed by its insulation while the exposed prongs 48 are dead.

The electrode holder 60 of the apparatus is shown in Figs. 10 to 15 of the drawings, and it is preferably connected to a length of very flexible rubber covered cable 20a whose opposite end is connected to the pronged element of a detachable connector so that the flexible cable 20a may be readily connected to the end of the less flexible cable 20 extending to the generator. This arrangement is preferably employed so that the length of the conductor may be varied at will by inserting or removing cable lengths provided at each end with detachable connector elements as described above.

The electrode holder 60 comprises a body element 61, a pair of electrode supporting jaws 62 and 63, an actuating sleeve 64, and a nut 27 and wedge member 28 for attaching the element 61 to the end of the cable 20a. A pair of insulating sleeves 66 and 83 are also provided which completely enclose the elements of the holder 60.

The end of the body element 61 to which the cable 20a is attached is threaded and shaped the same as the ends of the connector element 39 in the splice connection, and the cable 20a is clamped in the same manner. The method of clamping wherein the insulation is firmly gripped is of particular advantage here for pulling away of the insulation at the end of the holder 60 is more prone to occur because the holder is moved more often than the detachable connector and splice elements. The novel method of clamping, however, has proved to be a very durable, fully insulated coupling arrangement.

An enlarged hexagonal portion 65 is provided substantially at the middle of the body element 61 which serves as a wrenching surface as well as a lock to prevent loosening of the cable after the insulating sleeve 66 is slipped over the nut 27. This sleeve is similar to the sleeve 55 except that it is preferably held in place by a setscrew indicated at 67 to prevent it from slipping off.

The front end of the body element 61 is provided with a left-hand thread 68 on which the hexagonal actuator sleeve 64 is threaded. An axial bore 70 extends from the front end of the element 61 rearwardly to a point beyond the end of the thread. This bore receives a rod 71 whose front end is enlarged to form a head 72 which supports the ends of the jaw members 62 and 63. The rod 71 is secured in the bore 70 by a pin 73 which is driven in a transverse hole intersecting the bore 70.

The outside of the actuator sleeve 64 is preferably hexagonal. The inside contour at the forward end is rectangular while at the rear end it is cylindrical to accommodate the female thread 75. The purpose of making the front end rectangular in section is to give lateral support to the jaw elements which are pivotally mounted within the sleeve 64. Thus the electrode supporting ends of the jaws 62 and 63 are held in proper alignment whether the jaws are opened or closed.

The elongated jaw elements 62 and 63 are mirror images of each other except for the location of the electrode supporting grooves 76 at the front ends. The electrode supporting ends are somewhat larger than the remainder of the elements to provide a large gripping area so as to effect a good electrical contact with the electrode 77 when it is clamped therein.

The rear portion of the jaw elements 62 are undercut to provide spaced for a U-shaped separator spring 78 which urges the ends of the jaws apart. The undercuts leave a pair of luglike projections 80 which are slipped behind the head 72 on the rod 71 to fasten the jaws to the body element 61. Thus the jaws 62 and 63 may pivot about the head 72, but they may not move longitudinally.

The back side of each of the jaws opposite from the electrode engaging surface is provided with an inclined cam surface 81 which cooperates with one of a pair of inclined surfaces 82 formed by transversely milling the end of the sleeve as shown in the drawings. These surfaces serve to open and close the jaws as the actuator sleeve is advanced or retarded with respect to the body element 61 by rotating one with respect to the other. As the sleeve 64 is rotated so as to move rearwardly in the thread 75, the jaws are opened. When turned the other way, the jaws close. Due to the wedge-like action of the camming surfaces and the mechanical advantage produced by the thread, relatively large clamping forces are easily achieved at the jaw ends.

The novel arrangement of the grooves 76 in the ends of the jaws 62 and 63 make it possible to support the electrode in three different positions, namely, in line with the holder, perpendicular thereto, and at a 45° angle. These three positions are illustrated in Fig. 12. This is possible because the jaw 63 has two grooves disposed at right angles, and the jaw 62 has a single groove at a 45° angle. When the electrode is clamped in any one of the grooves, it engages a flat surface on the opposite jaw for firm support.

A further advantage, however, results from the novel groove arrangement, for it is possible to employ an insulating sleeve element 83 having a single opening 84 therein through which the electrode 77 extends regardless of which groove 76 in which it is supported. This occurs because all of the grooves intersect at the same point on the slanting edges of the jaws 62 and 63 when the two are clamped together, and the opening 84 in the sleeve 83 is located over this point. This is particularly advantageous when using the holder for overhead welding, for it is virtually impossible for any slag or molten metal to get into the jaws where it might interfere with their operation.

The sleeve 83 is preferably constructed of laminated phenolic cured on a mandrel just as are the other sleeves, the inside being hexagonal to fit the actuator sleeve, and the outside being ribbed for ease in handling. The rear end of the sleeve 83 is undercut so as to telescope into the sleeve 66 to completely enclose the metallic parts of the holder. To retain the sleeve on the holder, an undercut groove is provided at the front end of the sleeve 66, and a C-shaped spring is slipped in this groove and engages a shallow groove in the other sleeve to lock the two together. Thus the electrode opening 84 is kept in proper axial alignment with the jaws regardless of the position of the actuator sleeve 64, the insulating sleeve being slidable along the actuator sleeve.

Two paths for electrical current through the holder result. The most part of the current passes through the element 61 over the thread 75 to the sleeve entering the jaws 62 and 63 via the inclined cam surfaces which are tightly engaged when an electrode is clamped. A substantial portion of the current, however, passes through the axial rod 71 to the head 72 to the lugs 80 on the rear end of the jaws for these lugs bear solidly against the head 72 when the jaws are clamped. Thus the electrical resistance of the holder 60 is very low and all of the heat is concentrated at the arc.

To operate the holder 60 to replace a spent electrode, the welder merely grasps the insulating sleeve 83 in his left hand and the sleeve 66 in the other hand and twists the two in the direction he would twist a bolt held in his right hand and having a right-hand thread to loosen it. This opens the jaws 61 and 62. The electrode is then removed and replaced and the elements twisted in the opposite direction to clamp the jaws. These directions of twist are most natural for any one familiar with machines, and for that reason it is preferred to employ a left-hand thread 75 on the body 61 and sleeve 64.

To assemble the holder, the jaws 62 and 63 are placed together with the head 72 of the rod 71 between them in the undercut portion and with the spring 78 in place. This assembly is then slipped into the actuator sleeve 64 and the body 61 is threaded into the sleeve. As soon as the transverse hole in the rod 71 is in line with the hole in the body, the pin 73 is driven to secure the rod 71 in place. The insulating sleeve 83 is then slipped on and the pin 73 is driven to hold it in place.

The various parts of the connector elements disclosed herein are preferably made of brass or bronze having a high electrical conductivity. The elements of the electrode handle are preferably made of an aluminum alloy for lightness in weight. On a volume basis the aluminum alloys have a slightly lower conductivity than the brasses, but several alloys have conductivities over 50% of that of pure copper and are quite satisfactory. The oxide film which normally forms an aluminum and offers increased electrical resistance gives no trouble in the holder, for the juncture points at the thread and at the cam surfaces between the jaws and actuator sleeve are kept clean of oxide at all times due to the relative motion of the parts each time the jaws are loosened or clamped. Thus the only joints between elements which might become corroded and through which current must pass offer negligible resistance, making it possible to use aluminum and save considerable weight in the holder.

From the foregoing it will be apparent that a superior arc welding apparatus has been provided which minimizes circuit losses, increases welding efficiency and is completely insulated at all points where grounds are likely to occur. Furthermore, the apparatus is simple to fabricate and use in the field.

Various changes or modifications in addition to those set forth herein and such as will present themselves to those familiar with the art may be made without departing from the spirit of this invention whose scope is commensurate with the following claims.

What is claimed is:

1. An electrically conductive coupling for heavy current conducting cables which comprises, a female coupling member including a polygonal body having a concentric cylindrical bore of predetermined depth, said body having at the innermost extremity of its said bore opposed rectangular holes communicating with said bore, a male coupling member comprising a polygonal body having a cylindrical plug portion snugly receivable within the cylindrical bore of said female body member, said plug portion having forwardly extending prongs which constitute cylindrical continuations of said plug portion, said prongs being made of springable electrically conductive material with a normal disposition to effect wiping engagement against the internal bore surface of the female body member when inserted thereinto, and rectangular lugs at the forward extremities of said prongs for reception within the opposed rectangular holes of said female coupling member.

2. The combination set forth in claim 1 in which said lugs include beveled surfaces at corresponding leading edges whereby upon axial rotation of one of said coupling members with respect to the other, said prongs may be radially depressed under the camming action of said beveled surface engagement.

3. The combination set forth in claim 1 including longitudinally co-extensive sleeve elements of electrically insulating material encasing each said male and female members, one of said sleeve elements having a skirting flange overlapping a reduced nipple section of the other of said sleeve members during coupling engagement of said members.

4. The combination set forth in claim 3 in which each of said sleeve members comprises a tubular casing having an internal shape which conforms with the external shape of its coupling member and an inturned end flange to restrict the longitudinal movement thereof to a direction away from the coupling junction.

OTTO S. TIBBETTS.

References Cited in the file of this patent

UNITED STATES PATENTS

| Number | Name | Date |
|---|---|---|
| 779,469 | Dossert | Jan. 10, 1905 |
| 1,699,825 | Waltz | Jan. 22, 1929 |
| 1,910,973 | Tisza et al. | May 23, 1933 |
| 2,001,131 | Guhl | May 14, 1935 |
| 2,393,083 | Wisegarver | Jan. 15, 1946 |
| 2,395,213 | Bourque | Feb. 19, 1946 |
| 2,473,388 | Rambo | June 14, 1949 |
| 2,506,979 | Varnum | May 9, 1950 |

FOREIGN PATENTS

| Number | Country | Date |
|---|---|---|
| 151,505 | England | Sept. 30, 1920 |